US008181253B1

(12) United States Patent
Zaitsev et al.

(10) Patent No.: US 8,181,253 B1
(45) Date of Patent: May 15, 2012

(54) SYSTEM AND METHOD FOR REDUCING SECURITY RISK IN COMPUTER NETWORK

(75) Inventors: Oleg V. Zaitsev, Moscow (RU); Valery A. Boronin, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/173,538

(22) Filed: Jun. 30, 2011

(30) Foreign Application Priority Data

Apr. 19, 2011 (RU) ................................ 2011115363

(51) Int. Cl.
*G06F 11/00* (2006.01)
(52) U.S. Cl. ..................... 726/25; 726/1; 726/2; 726/14; 713/152; 713/164; 713/166
(58) Field of Classification Search .................. 726/1, 2, 726/14, 25; 713/152, 164, 166
See application file for complete search history.

(56) References Cited

U.S. PATENT DOCUMENTS

| | | | |
|---|---|---|---|
| 5,953,422 A * | 9/1999 | Angelo et al. ................ 713/185 |
| 6,367,011 B1 * | 4/2002 | Lee et al. ...................... 713/172 |
| 6,530,024 B1 | 3/2003 | Proctor |
| 7,530,106 B1 | 5/2009 | Zaitsev et al. |
| 7,647,622 B1 | 1/2010 | Sobel et al. |
| 7,908,660 B2 | 3/2011 | Bahl |
| 2003/0145222 A1 * | 7/2003 | Gittler et al. ................. 713/200 |
| 2004/0107190 A1 * | 6/2004 | Gilmour et al. ................... 707/3 |
| 2006/0007936 A1 * | 1/2006 | Shrum et al. ............. 370/395.21 |
| 2008/0005076 A1 * | 1/2008 | Payne et al. ........................ 707/3 |
| 2008/0189788 A1 * | 8/2008 | Bahl ............................... 726/25 |
| 2009/0074261 A1 * | 3/2009 | Haupt et al. .................. 382/118 |
| 2009/0282473 A1 * | 11/2009 | Karlson et al. .................. 726/17 |
| 2010/0005179 A1 * | 1/2010 | Dickson et al. ............... 709/228 |
| 2010/0029370 A1 * | 2/2010 | Robinson et al. .............. 463/25 |
| 2010/0125491 A1 * | 5/2010 | Elliott et al. ................. 705/14.4 |
| 2010/0125911 A1 | 5/2010 | Bhaskaran |
| 2010/0132041 A1 | 5/2010 | Chu et al. |
| 2011/0246817 A1 * | 10/2011 | Orsini et al. ................... 714/6.1 |

* cited by examiner

*Primary Examiner* — Saleh Najjar
*Assistant Examiner* — Joseph Pan
(74) *Attorney, Agent, or Firm* — Arent Fox LLP; Michael Fainberg

(57) ABSTRACT

Disclosed are systems, methods and computer program products for reducing security risk in a computer network. The system includes an administration server that collects system usage, user profile and security incidents information from a plurality of computers in the network. The server determines values of one or more risk factors for each computer using the collected information. The server then calculates security rating of each computer user as a function of the risk factors and adjusts the calculated security rating of a given computer user based on the security ratings of other computer users with whom the given computer users communicates. The server then selects, based on the adjusted security rating, security settings for the computer of the given user in order to reduce user's security risk to the computer network and applies the selected security settings to the computer of the given user.

18 Claims, 8 Drawing Sheets

SYSTEM AND METHOD FOR REDUCING SECURITY RISK IN COMPUTER NETWORK

CROSS-REFERENCE TO RELATED APPLICATIONS

This application claims benefit of priority under 35 U.S.C. 119(a)-(d) to a Russian application no. 2011115363 filed on Apr. 19, 2011, which is incorporated by reference herein.

TECHNICAL FIELD

The present invention relates to the field of network security and, in particular, to systems, methods and computer program products for network security administration in view of the risks related to the behavior and characteristics of computer users.

BACKGROUND

The security of enterprise computer networks (ECN) depends on the security of each particular computer in the network. The monitoring of the information security incidents within the ECN and the remote configuration of the security components are critical problems the ECN administrators have to deal with. Currently, there are ECN administration tools that remotely register security incidents (e.g., violations of security policies), compute security risks and configure the users PCs according to the security policies. However, these security tools only analyze past security incidents, thereby failing to reach the desired security level, which could have been achieved had these security incidents been prevented. The mentioned security events include system events detected on the user computers, such as reading/writing of files, user authentication, execution of applications, loading of data, network communications, changes to the system configuration and other events.

Furthermore, since individual computer users differ from each other in their computer skills, presence of an unskilled computer novice in the ECN is may present a high risk of information leakage or resources breakdown, which would cause a great loss to the resource owners. This problem is particularly urgent for the large enterprise computer networks where the risk of information leakage or denial of service to the system users is critical. A solution presented herein consists in preventing the security incidents in the network based on the analysis of the security risk of individual users and adaptive configuration of their computers.

SUMMARY

Disclosed are systems, methods and computer program products for reducing security risk in a computer network. The system includes an administration server that collects from a plurality of computers in the network information about computer usage, security incidents, and communications between computer users. The server retrieves, for each computer user, a user profile comprising at least personal and professional information of the user, and a plurality of risk factors associated with the user. The server calculates, for each computer user, values for the plurality of risk factors in the user profile based on the computer usage information collected from the computer of each user. The server also calculates, for each computer user, a user security rating based on the values of one or more risk factors of the plurality of risk factors in the user profile. The server may also adjust a security rating of at least one computer user based on (i) the personal or professional information of said at least one computer user, and (ii) the security rating of at least one other computer user with whom said at least one computer user communicated. Finally, the server selects security settings for the plurality of computers based on the security ratings of the users of said computers, thereby reducing security risk in the computer network.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for prediction and prevention of security incidents in an enterprise computer network (ECN). Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
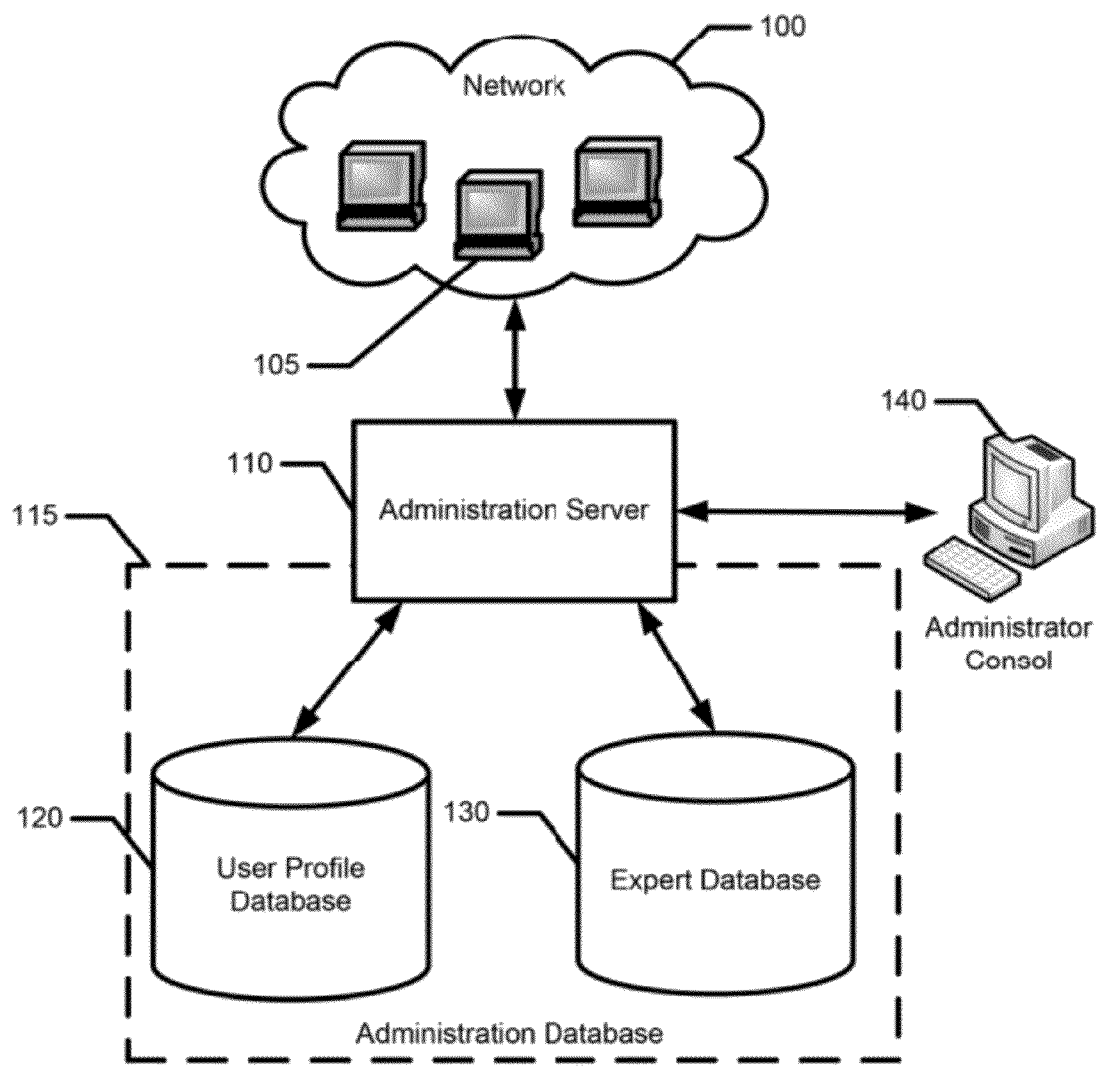
FIG. 1 illustrates an interaction between a user computer system and an administration server according to one example embodiment.

FIG. 1 illustrates one example embodiment of the configuration of the system for prediction and prevention of security incidents in ECN 100. The system has a client-server configuration and comprises an administration server 110, administration database 1120 and a plurality of client computers 105. In one example embodiment, the administration server 110 may be a software application deployed on the PC 105. In another example embodiment, the administration server 110 may be deployed on a remote server hosted by a trusted service provider. In addition, administration database system 115 can be local to or remote from the administration server 110. The administration server 110 is connected to the ECN 100 in a way to provide a connection to each administered computer 105 in the network 100. The system also includes an administrator console 140, which functions as administrator's workplace for controlling the administration server 110. A group of administrators can use several consoles 140. The console 140 allows visualization of the network condition, threat signalization, monitoring the processes of setting and update, and other information security (IS) functions. The data processed by the server 110 may be stored in the expert database 130 and in the user profile database 120 of the administration database system 115. This data may include, but is not limited to, event logs, users' personal information, networked PCs information, security settings, security policies, the expert data required for operation of the system for prediction and prevention of security incidents in the ECN 100 and other types of information.

Figure 2:
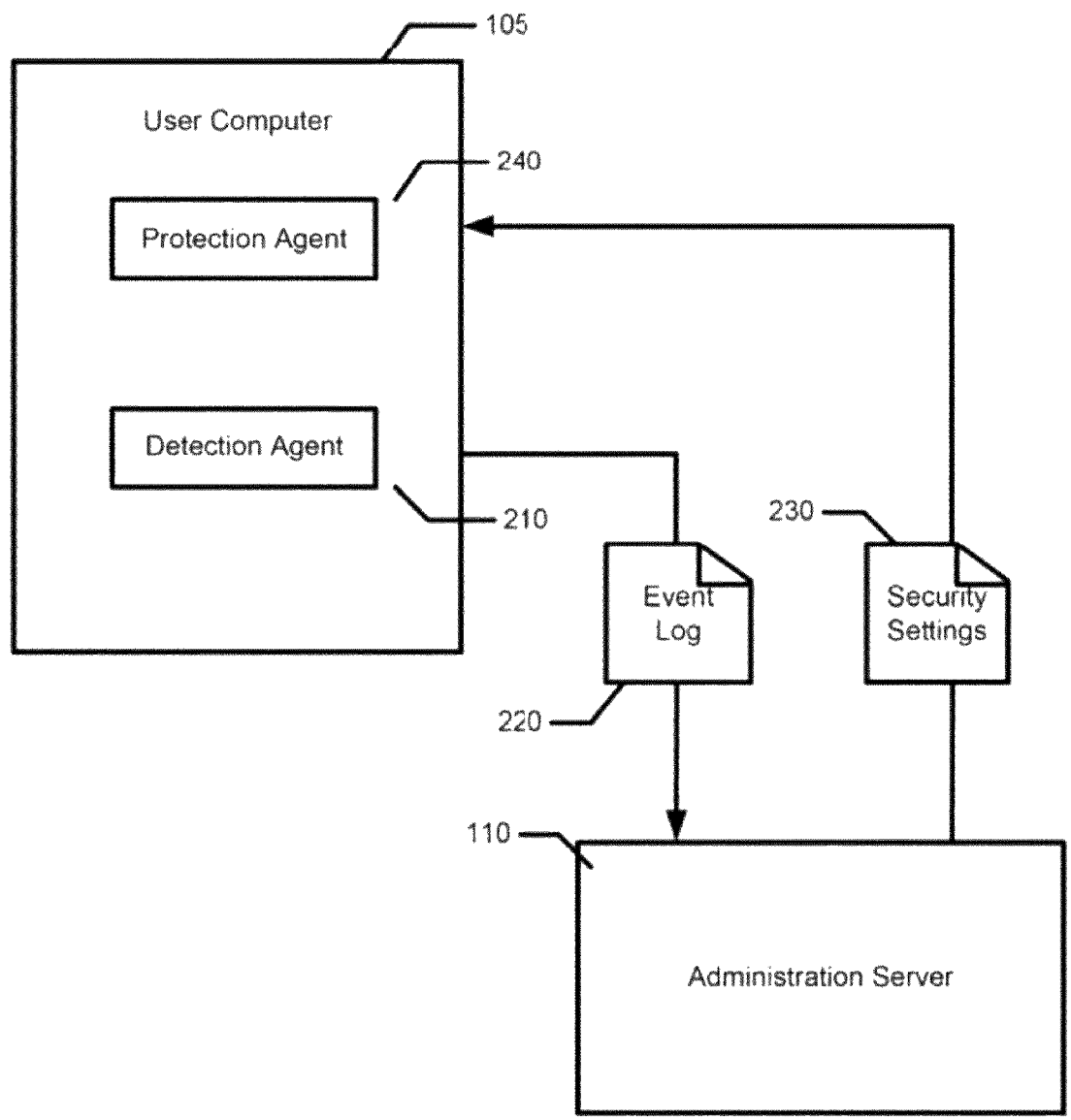
FIG. 2 illustrates the interaction between the user computer and the administration server in according to another example embodiment.

One example embodiment of the operation of the system for prediction and prevention of security incidents in ECN 100 is shown in FIG. 2. During the operation, the user of the PC 105 performs various operations; some of them can be harmful to the PC 105 as well as to other computers in the network 100. To detect such cases, a detection agent 210 may be deployed on the user PC 105. The detection agent 210 may be a component (e.g., a program or a script) of an antivirus application installed on the PC 105. The detection agent 210 may be configured to check the PC 105 for malware (e.g., viruses, Trojans) and other vulnerabilities and threats. In the case a malicious code or a harmful user activity is detected, an infection record is generated and stored in an event log 220, which may be sent to the administration server 110. The logs 220 can be transmitted by the detection agent 210 to the administration server 110 at periodic intervals or in real-time as events are detected. For example, if the detection agent 210 detects execution of a malicious code on PC 105, the event data about this incident may be immediately sent to the server 110. For example, the event information transferred by the detection agent 210 to server 110 may include, but is not limited to, the incident detection time, the malware or vulnerability name, the data about the virus intrusion method, the directory where the virus has been detected, the user activity preceding the infection, and other information. The server 110 analyzes the received data and transmits to PC 105 a list of preventive measures 230, such as software settings, access right restrictions, penalty notices, security training instructions and other measures aimed at reducing the risk of infection or loss of information on PC 105.

The users often install on their PCs 105 in ECN 100 various applications that are not approved by the security service. Here and further on, the term application means a program designed to perform certain user tasks and meant for direct interaction with the user. In most cases, the applications have no direct access to the computer resources; they interact with the CPU and the memory via the operating system. Such applications often have vulnerabilities and errors; and in the case of online downloading, there is a great probability that the setup file may be infected with a computer virus. In addition, users often use various devices, such as cell phones, flash memory cards, external hard drives and photo cameras to transfer data, images and audio files to and from PCs 105. These storage devices may contain malware that can quickly propagate in the ECN 100 due to the portability of these devices. The infection occurs at the moment of interchange of users' files or information between computers in the network 100.

The research of the network security problems has revealed that: (i) the computer literacy level of users of enterprise computer networks depends on age, education, gender, operation experience and other personal characteristics; (ii) the unrestricted activity of the users increases the risk of infection of the user's computer system; (iii) the computer protection level should correspond to the user's position in the company; (iv) the quality of the work of the user from the point of view of information security may change with the time depending on the personal characteristics and the administration actions; (v) security rating of the users depends on their communications with other users in their network. Accordingly, these factors are taken into consideration by the system for prevention of security incidents of the present invention.

In one example embodiment, the user security rating is a parameter or a set of parameters defining the risk of security incidents on the user PC connected to the ECN. In other words, the user security rating may reflect security risks of user activity and system usage. For instance, an intensive Internet activity of the user increases the computer infection risk and thus decreases the user security rating. In one example embodiment, the values of security ratings may be expressed as numerical values in a range from 0 to 100. In other embodiments, user security rating may be expressed as a relative value in a range from 0% to 100%. In this case, the user whose activity in the ECN presents no security risk will have a high security rating. Analogously, user whose activity is extremely harmful will have a much low security rating.

For objective evaluation of the user security risk, administrative server 110 may collect from PCs 105 using detection agents 210 deployed thereon computer usage information associated with the following risk factors. The following list of risk factors is merely exemplary and may include other factors.

1. External drive usage (coefficient Xf): the number of events of external drive connection, Xf1; the number of external drives connected to the PC per time unit Xf2 (the uniqueness of the drives is determined by their serial number and vendor which are accessible through an API interface); the number of launches of executable files from external drives, Xf3; the number of malware detected by the detection agent in storage devices, Xf4; the number of connections of digital devices, Xf5 (i.e., devices that are not storage devices in their primary use, e.g., a media player);

2. Web-browsing (coefficient Xi): the number of websites browsed per time unit, X11; the number of unique websites browsed, Xi2; the number of executable files downloaded, Xi3; the number of malware detected by the antivirus system in the user's traffic, Xi4; the level of authorized website usage which is determined by the number of authorized websites in the authorized website list, Xi5; the level of illegal browsing of black-list websites (e.g., parental control database, illegal URL database), Xi5; the level of social network browsing activity, Xi6;

3. Software installation and PC operation (coefficient Xp): the number of new software installations, Xp1; the number of existing software uninstallations, Xp2; the number of PC restarts per time unit, Xp3; the number of the PC operation failures determined by the system log (e.g., Blue Screen of Doom, program crash), Xp4; the number of software installed in total, Xp5; the number of autorun applications, Xp6.

In the example above, coefficient Xp, Xi, Xf are values of the risk factors, such as external drive usage, web browsing and software installation that form the summarized security rating of the user. The individual security rating for these risk factors, such as external drive usage (coefficient Xf), may be calculated using the following formula: $Xf=Xf1*Pf1+Xf2*Pf2+Xf3*Pf3+Xf4*Pf4+Xf5*Pf5$, where Pf are weight coefficients of the risk factor significance. In one example embodiment, the total user security rating may be calculated as a sum of values of individual risk factors, e.g., Xp, Xi and Xf. In another example embodiment, the user security ratings may be calculated using fuzzy logic, such as the Mamdani algorithm.

The practical research of the considered methods was conducted on a sampling consisting of more than a thousand PCs. If the risk threshold value of the user is set at the level of a tripled average value, then the number of users exceeding the threshold will be about 3%. The results of the research have shown that most of the users selected in this way were subjects to various investigations, and many of their PCs contained viruses that were non-detectable by the detection agent 210, such as an antivirus application or the like.

The user security ratings may have associated security settings 230 for the protection agent 240 of PC 105. In particular, once the security rating for the user of the PC 105 is calculated, the administration server 110 selects appropriate security setting 230 and sends them to the protection agent 240 on PC 105. Agent 240 may be a component of the antivirus application deployed on the PC 105. In one example embodiment, the security settings 230 may include a list of settable parameters for various components of the protection agent 240, i.e., antivirus application, responsible for spam filtering, spoofing, detection of network attacks and viruses. These parameters may be set according to the protection level in the range between the off mode and the operation at peak capacity. In another example embodiment, the security settings 203 may also include a security policy that user of the PC 105 should follow during operation of the computer. The increase of the capacity of all components can result in a shortage of computational resources. The optimization of the settings 230 in accordance with the user security rating permits to maintain the balance between system performance and security. For example, if a computer user actively browses various websites and uses many external drives that cause infection, then the system applies to that user PC a strict security policy that prohibits launching of executable files from external drives and sets the maximum level of protection from network attacks.

Figure 3:
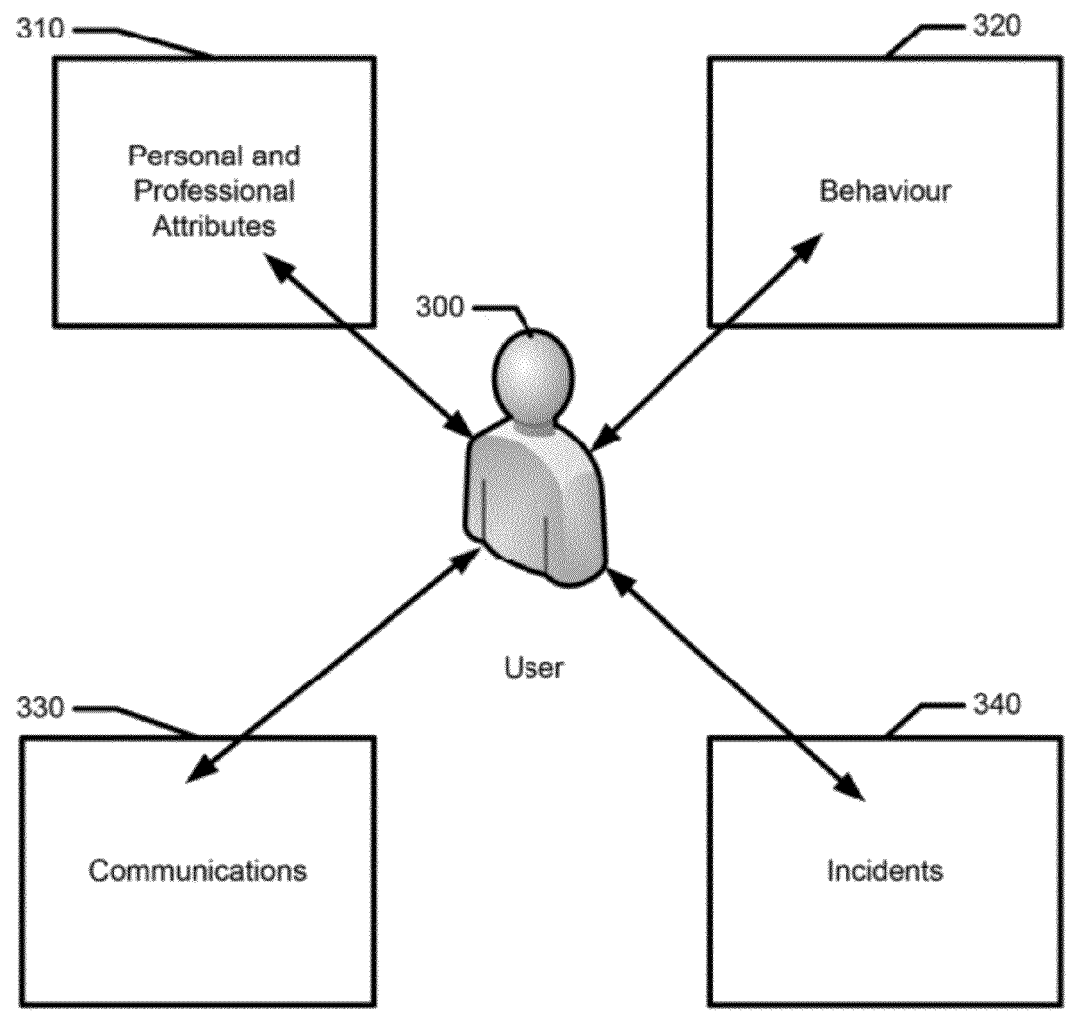
FIG. 3 illustrates examples of information collected the administration server according to one example embodiment.

FIG. 3 shows contents of the user profile 300 maintained on the administration server 110. Two of the user evaluation criteria stored in the user profile are user attributes 310 and user behavior information 320. The administration server 110 may also maintain in the user profile 300, or in another database, information about user's communication 330 and incident 340.

Figure 4:
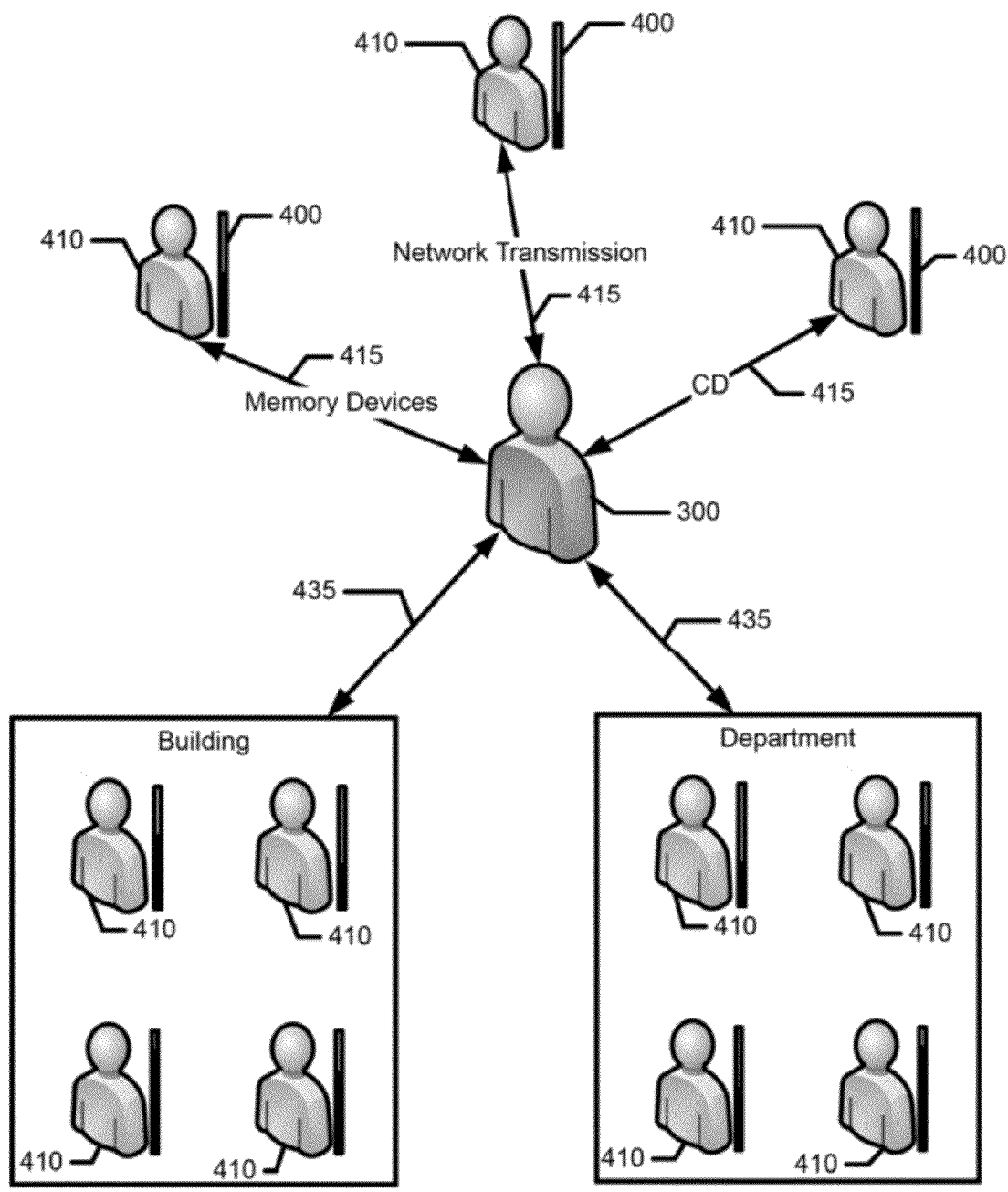
FIG. 4 illustrates an example of users' communication according to one example embodiment.

The user communications 330 include communication between two or more users defined by the data exchange within the ECN or by certain probability for data exchange between these users within the ECN. The principle for evaluation of the user security rating 400 based on the user's communication is shown in FIG. 4 and is based on the: communication flow event 415 and social communication 435.

The communication flow event 415 is determined by the common usage of single data storage media or other device, data transmission within the network, or messaging between users 410. The corporate (e.g., social) communications 435 involves high probability of communication flow between the users 410 due to their close location or their job duties. The user rating evaluation 400 based on the communication means that the user security rating depends on the ratings of the other users he/she is communicating with. If the system determines the communication of two users by any attribute, then the infection of one user PC makes the infection of the other user PC probable. This principle makes the security risk evaluation more accurate. It is conditioned by the fact that the rating of the user 400 without taking into account his/her communications can appear erratic if the rating of the user's environment is much lower.

As an example, let's consider the ideal user in the IS terms who does not browse, does not install additional software and fully complies with the ECN security policy. This user presents a very low security risk, and, therefore, his security rating will be close to the highest possible value until the communications of such user have been taken into consideration. Let's consider that such a user works in a department where all other users violate the IS security policy rules and their security ratings are much lower. In this case, there is a high probability that the user PC is much more vulnerable to viruses and other threats due to user's network communications or exchange of files with his colleagues. Therefore, if communications of the user are considered, his/her security rating should be decreased or otherwise adjusted to reflect that security risk of the user becomes much higher due to high security risk of his colleagues.

In one example embodiment, information about incident dynamics at the user PC may be used in determining user security rating. Ideally, the number of incidents should decrease with the time and tend to zero. Any deviation from this trend should be considered as a wrong setting of the system and as inadequate administration of the PC. The reverse situation is the parameter of authorized web browsing; its increase should not cause any incidents. The system described here enables the analysis of each Xj coefficient. For example, user PC is regularly infected via websites, but the value of risk factor Xi does not change with the time. The user security rating should not change as well according to the rules used for its evaluation. Thereafter, the protection agent settings will not vary either. As a result, the number of incidents on user PC stays the same. If during calculation of the user security rating dynamics of the occurred incidents are taken into account, then, in the case of regularly infected user PC, the security rating will decrease or otherwise adjusted to enhance security settings of protection agent. If the number of incidents decreases with time, the security rating will increase or otherwise adjusted to reduce the restrictions on the user operation rights.

Figure 5:
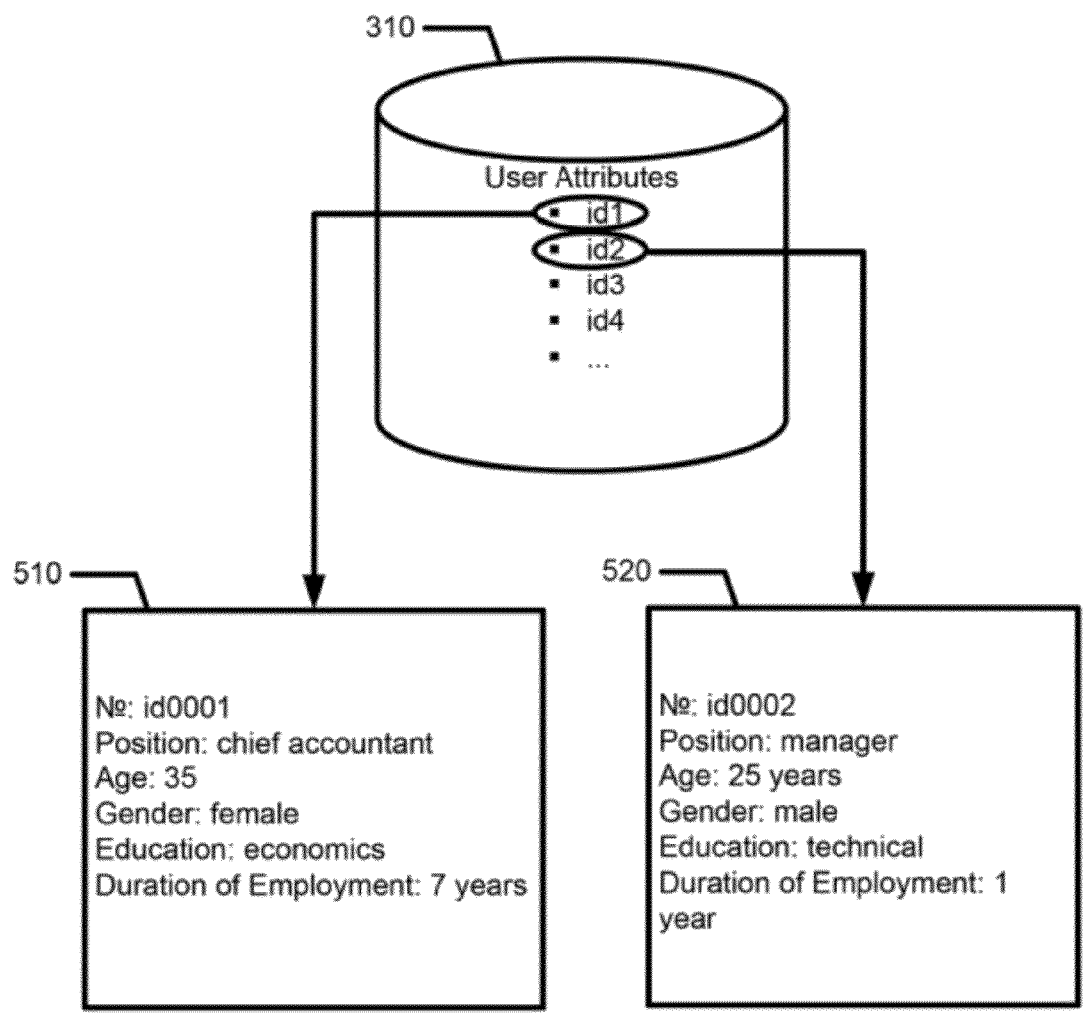
FIG. 5 illustrates an example of a user profile maintained by the administration server according to one example embodiment.

In one example embodiment, the personal and professional information about PC users may be used in determining user security ratings. FIG. 5 shows the table of user attributes that can be maintained in the user profile database. The records of two users are shown in the table as examples. The first record 510 is of a technically educated user, male, 25-year-old working as a sales clerk. This user's position does not authorize him to work with trade secret information; therefore, if he observes the security policy and does not perform harmful activity, his security rating threshold may be low. The second record 520 is of a female user, 35-year-old working as a chief accountant. Any documents this user works with represent a trade secret of the company. Even if this user observes the security policy and does not perform harmful activity, her security rating threshold should be adjusted to average due to the risks of possible loss of important information. The security rating thresholds therefore may be set my network administrator based on the information contained in the user profile and, for example, based on user age, gender, job position or other personal and professional attributes.

Figure 6:
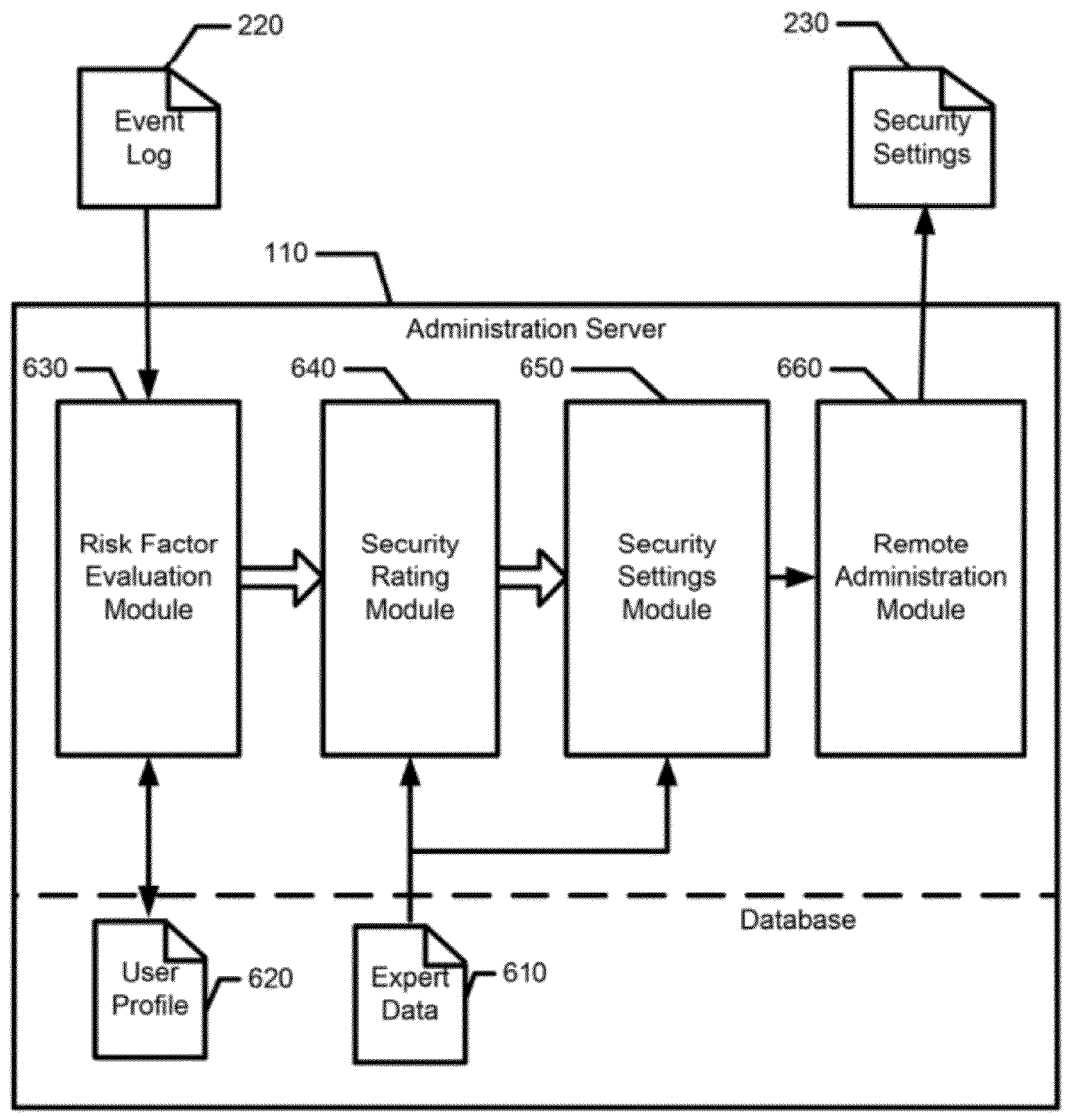
FIG. 6 illustrates a functional flow block diagram of the administration server according to one example embodiment.

One example embodiment of the configuration of the administration server illustrated in FIG. 6. The risk factor evaluation module 630 of the server 110 received from the detection agent (e.g., antivirus software) deployed on the user computer 105 the collected information 220, including, but not limited to system event logs, incident information and user activity reports. The module 630 also accesses' user profiles 620 maintained in the local database. The module 630 then performs qualitative and quantitative evaluation of various risk factors of user PCs and outputs a set of values for various risk factors. The evaluation can be made by counting various system events, instances of security incidents, and instances of dangerous/harmful user activities and comparing them with the threshold values preset by the administrator. The risk factors as a set of values are passed to the security rating module 640, which calculates user security ratings for the computer users based on the provided risk factors. In particular, each, risk factor may be processed by one or several analyzers of module 640 using crisp and fuzzy logic rules and statistical or other methods. Each analyzer uses algorithms selected by membership functions, structure model, rules and weight coefficients contained in the expert database 610. The fuzzy logic rules accept as input value of various risk factors and output linguistic values of user security ratings indicating security risk of a particular user computer.

Next, the security rating modules 640 passes the calculated security ratings to the security setting module 650 that reconverts the numeric or linguistic security ratings into the actual security settings for the user computers 105. The relationship between security ratings and security settings may be set by means of any method of dependence function: formula, graph, table and others. In one example embodiment, fuzzy logic may be used to select appropriate security settings based on the input security ratings. For example, a fuzzy logic analysis module may be used to determine the need to disable the launching of executable files from the external drive of the user. The module may be a Mamdani fuzzy logic system. The input parameters are security ratings calculated from the user data. Since there may not be a unique solution, competition may occurs—a situation where the solutions differ for each input parameter. For example, the user attributes inspire confidence which cannot be said about the statistics of the user PC infection from external drives. The Mamdani algorithm helps to generate a unique set of security settings for the antivirus application and other components of PC 105 based on expert data, including correction factors, exclusions and groups of users.

Finally, the selected security settings for the protection agent (e.g., antivirus application) including security policies for the computer, software usage and installations restrictions, network access settings, computer usage restrictions, user training materials, and administrative notifications are passed to the remote administration module 660, which is configured to identify and establish connection to the protection agents deployed on user PCs 105 and to transmit the appropriate security settings 230 to the appropriate protection agents.

Figure 7:
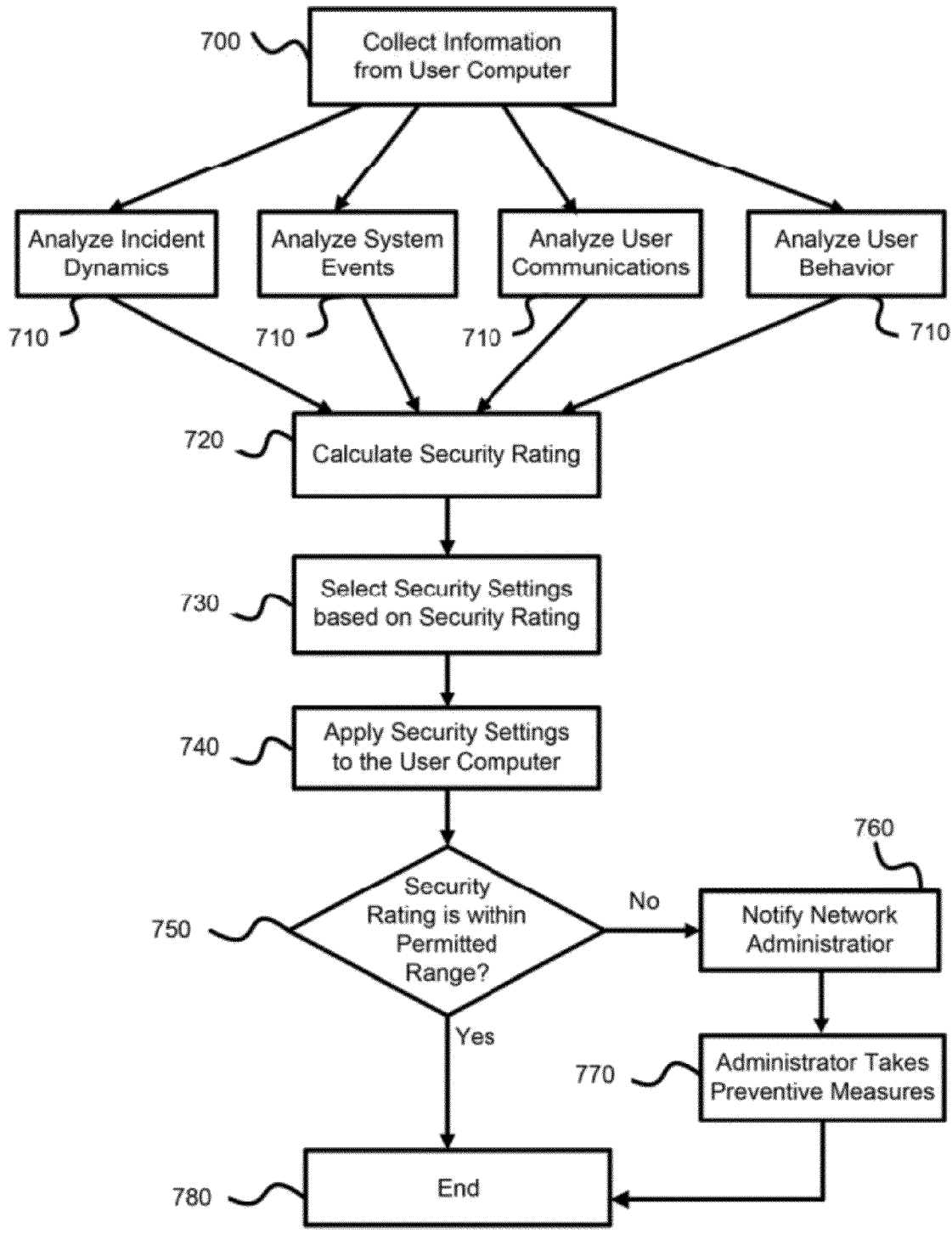
FIG. 7 illustrates a flow diagram of the method for operation of the administration server according to one example embodiment.

One example embodiment of a method for reducing security risks of a computer is illustrated in FIG. 7. The process initiation does not affect the technical outcome and can be performed both periodically and based on an event, for example by user command or at the detection of an IS threat. At step 700, administration server collects event logs, system logs, user profile, incident information and other data from user PCs and local databases. The collected data is processed at steps 710 to determine values of risk factors. The process of analysis includes sorting, counting, and numeric data correlation for each data type. The process results in a set of numeric values of risk factors $\{X1, X2, X3 \ldots \}$. At step 720, security ratings of the user PC are computed/adjusted based on the determined risk factors. The rating is a numerical or linguistic value reflecting the IS risks related to the user PC operation. The number of possible security ratings is not limited, so the number of attributes, variables and rating calculating functions can be arbitrarily large. The main attributes that PC security depends on are user personal information, PC usage information, user communication information, and incident information collected from the PC. This list is not limited; it can also include external factors, such as current virus epidemics or geographical location of the PC, if it is portable. The settings 730 for the PC, including its security features, are based on the calculated ratings. These settings are applied within the ECN. The ratings have preset critical levels that determine the allowable ranges for secure PC operation. In one example embodiment, the present security rating ranges may depend on the user's position (i.e., occupation) within the company as explained above. If the rating exceeds the margin set, at step 750, the system generates the alert 760 accompanied with an audible, text or graphic message, thereby informing the ECN administrator that prevention measures 770 are required. Except for the strict settings in the PC, the preventive measures can include training programs, penalty scheme, toughening of the PC access mode and other sanctions. If the rating has not reached its critical level after taking the administrative measures or after introducing the necessary PC settings, the cycle is completed 780.

As a rule, a particular protection module, or at least one PC parameter or security policy rule are responsible for applying new security settings to the user PC. For example, various components of the antivirus application deployed on PC 105 (e.g., script emulator, firewalls, browser virtualization, black list of URLs and others) may be responsible for controlling Internet browsing ability of the user. The software and hardware installation, and the use of external drives, in particular, are control by the security policy and are limited by user rights (e.g., administrator rights, user rights, guest rights and others). The security policy may be implemented by the PC operating system together with the antivirus application. The settings in the PCs may be set remotely from the administration server.

In one example embodiment, a user security rating can be defined by a linguistic variable: very low (VL), low (L), below average (BA), average (A), above average (AA), high (H), very high (VH). There can be more than seven variables, and the calculation accuracy depends on the number of the variables. Precisely this evaluation is applied in the fuzzy matching method (e.g., Mamdani algorithm). Table 1 shows risk factors, their values according to the data obtained from the user profile and from the PC (by the detection agent), and associate user security ratings. All risk factors in the table below are divided on the base of the attributes (personal attributes, communications flow, etc.). Each parameter is subjected to a fuzzification process, i.e. a transition to the fuzzy variables (linguistic variables). The levels of fuzzy variables are stored in the expert database; they are set by IS experts and calculated on the basis of the statistical data of the group of users; next they are updated and then the corresponding level is determined as a result of a comparison with an attribute value. For example, for the "age" attribute, the level breakdown can be as follows: up to 20 years and above 50 years the security rating is "high", between 20 and 25 years and between 40 and 50 years the security rating is "average", between 25 and 40 years the security rating is "low".

TABLE 1

| User ID | Risk factors: user information, communications, and system usage | $X_{t-1}$ | $X_t$ |
|---|---|---|---|
| User attributes | Age = 25 years | L | L |
| | Gender = male | VH | VH |
| | Work experience = 1 year | VL | VL |
| | Position = sales clerk | AA | AA |
| | Education = technical | H | H |
| Communication flows | ID = 0056 | A | A |
| | ID = 0232 | BA | BA |
| | ID = 0516 | AA | AA |
| | ID = 0185 | | A |
| External device usage | Number of connections = 15 | BA | H |
| | Number of devices = 2 | A | A |
| | Number of EXE launches from external drives = 9 | A | AA |
| | Number of malware detected in storage devices = 1 | A | L |
| | Number of digital connections = 2 | L | BA |
| Internet browsing | Number of browsed websites = 142 | H | AA |
| | Number of unique browsed websites = 12 | A | A |
| | Number of EXE file downloads = 4 | BA | BA |
| | Number of malware in user's traffic = 1 | H | BA |
| | Level of authorized website usage = 7 | A | AA |
| | Level of unauthorized website browsing = 2 | A | A |
| | Level of social network activity = 28 | H | B |
| Software operations | Number of new software installations = 4 | A | AA |
| | Number of existing software uninstallations = 1 | VL | L |
| | Number of PC restarts per time unit = 0 | L | VL |
| | Number of failures in PC operation = 0 | VL | VL |
| | Number of installed software, total = 22 | A | AA |
| | Number of autorun applications = 6 | A | A |

Table 1 shows user security ratings for the last Xt and the preceding Xt-1 operation cycles of the system for reducing security risk in the ECN. The changes in security ratings over time can be used to determine whether changes to the security setting are necessary or not. Rating history can differ in size and data may be stored during a period ranging from several hours to several years.

To calculate user security ratings, the security rating module 640 may use values of risk factors from Table 1. The rules implemented in the modules 640 have a causal basis:

IF {parameter value="X1"}, THEN {risk value="Y1"}

The conditions here are attribute values. The sample of rules for evaluation of the PC traffic limitation requirement looks as follows:

IF ("unauthorized website browsing level"="LOW")
  THEN "traffic limitation requirement"="LOW"

IF ("unauthorized website browsing level"="MEDIUM") THEN "traffic limitation requirement"="MEDIUM"

IF ("unauthorized website browsing level"="HIGH")
  THEN "traffic limitation requirement"="HIGH"

IF ("authorized website browsing level"="LOW")
  THEN "traffic limitation requirement"="HIGH"

IF ("authorized website browsing level"="MEDIUM") THEN "traffic limitation requirement"="MEDIUM"

IF ("authorized website browsing level"="HIGH")
  THEN "traffic limitation requirement"="LOW"

The model has two inputs "authorized website browsing level" and "unauthorized website browsing level" and one output "traffic limitation requirement".

The rules may be based on the values of user security ratings and not on values of parameters:

IF ("Internet usage risk rating"="HIGH") THEN
  "traffic limitation requirement"="HIGH"

In this case, the number of rules will decrease significantly because there is no need to create rule for every parameter and a single rule covers a group of related parameters listed above.

Each rule has a certain weight factor permitting to avoid a rule conflict. After determining the traffic limitation level, the selection of security settings can be based on the dependence set shown in Table 2 below.

TABLE 2

| Traffic limitation required | Firewall setting |
|---|---|
| Low | Enable incoming traffic check |
| Medium | Enable incoming and outgoing traffic check |
| High | Enable incoming and outgoing traffic check and disable the access to unauthorized websites |

Next, the security settings are sent to the user computer. The process of ECN setting depends on the kit of the security components (e.g., antivirus application, firewall) installed on the user PC. It is performed by using the known methods of network administration.

Figure 8:
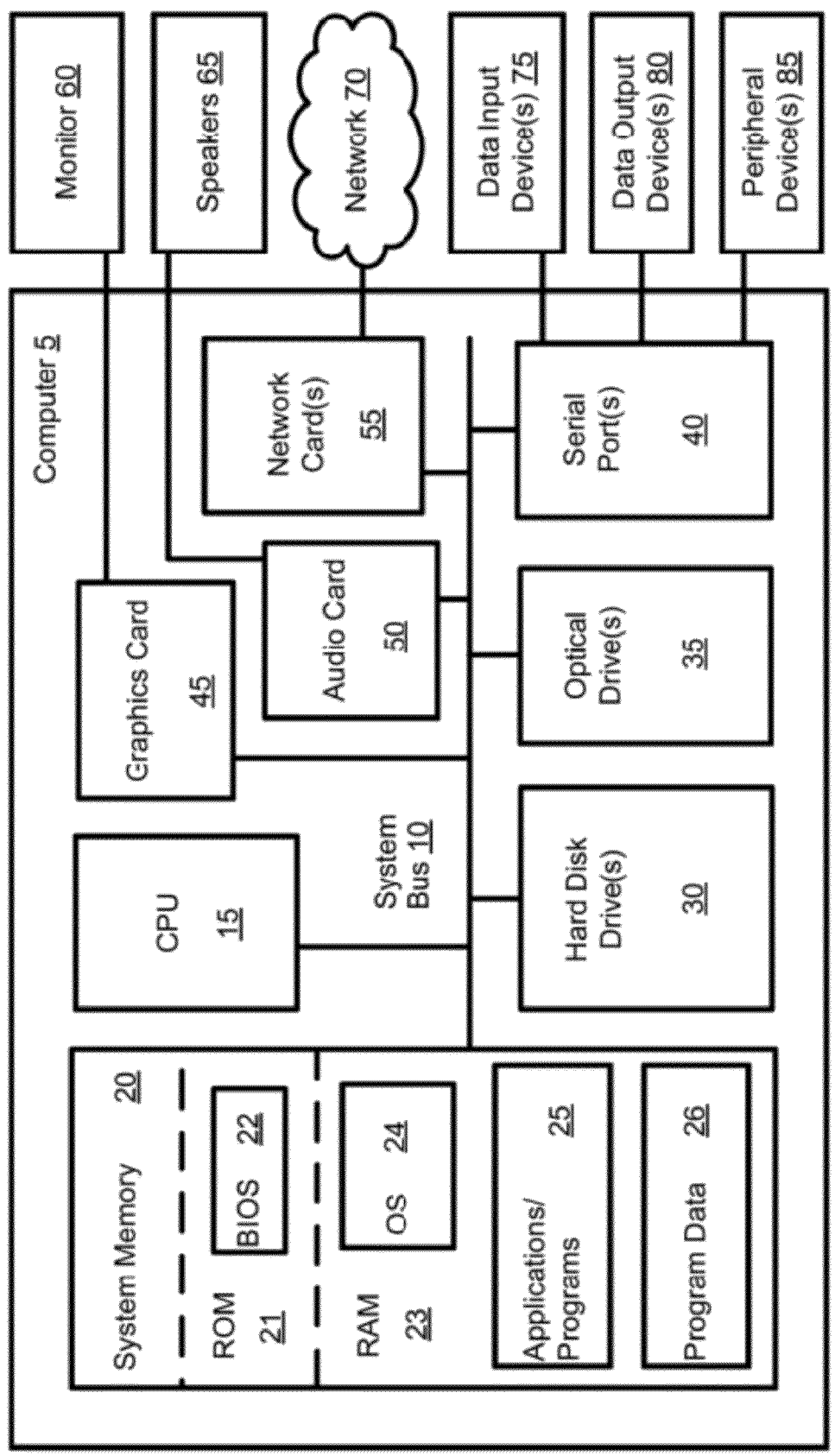
FIG. 8 illustrates a schematic diagram of a computer system according to one example embodiment.

FIG. 8 depicts one example embodiment of a computer system 5, such as a user PC 105 or administrative server 110. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer-implemented method for reducing security risk in a computer network, the method comprising:
   collecting, by a processing device, from a plurality of computers in the network information about computer usage, security incidents, and communications between computer users;
   retrieving, for each computer user, a user profile comprising at least a personal and professional information of the user, and a plurality of risk factors associated with the user;
   calculating, for each computer user, values for the plurality of risk factors in the user profile based on the computer usage information collected from the computer of each user;
   calculating, for each computer user, a user security rating based on the values of one or more risk factors of the plurality of risk factors in the user profile;
   adjusting a security rating of at least one computer user based on (i) the personal or professional information of said at least one computer user, and (ii) the security rating of at least one other computer user with whom said at least one computer user communicated;
   selecting security settings for the plurality of computers based on the security ratings of the users of said computers; and
   applying the selected security setting to the plurality of computers to reduce security risk in the computer network.

2. The method of claim 1, wherein calculating a user security rating comprises: applying fuzzy logic rules to the values of one or more risk factors in the user profile.

3. The method of claim 1, wherein adjusting a security rating of at least one computer user based on the personal information of said at least one user comprises:
   adjusting the security rating of said at least one computer user based on one or more of the age and gender of said at least one computer user.

4. The method of claim 1, wherein adjusting a security rating of at least one computer user based on the professional information of said at least one user comprises:
   adjusting the security rating of said at least one computer user based on one or more of the job position, work experience, and level of education of said at least one computer user.

5. The method of claim 1 further comprising:
   adjusting the user security rating of at least one computer user based on information about security incidents on the computer of said at least one computer user.

6. The method of claim 5, wherein the information about security incidents includes: type of incident, source of incident, time of incident, and user activity preceding the incident.

7. A system for reducing security risk in a computer network, comprising:
   a memory being configured to store a plurality of user profiles for a plurality of computer users, each user profile comprising at least a personal and professional information of the computer user, and a plurality of risk factors associated with the computer user;
   a processor coupled to the memory, the processor being configured to:
   receive from a plurality of computers in the network information about computer usage, security incidents, and communications between computer users;
   retrieve from the memory a user profile for each computer user;

calculate, for each computer user, values for the plurality of risk factors in the user profile based on the computer usage information received from the computer of each user;

calculate, for each computer user, a user security rating based on the values of one or more risk factors of the plurality of risk factors in the user profile;

adjust a security rating of at least one computer user based on (i) the personal or professional information of said at least one computer user, and (ii) the security rating of at least one other computer user with whom said at least one computer user communicated;

select security settings for the plurality of computers based on the security ratings of the users of said computers; and apply the selected security setting to the plurality of computers to reduce security risk in the computer network.

8. The system of claim 7, wherein to calculate a user security rating, the processor being further configured to apply fuzzy logic rules to the values of one or more risk factors in the user profile.

9. The system of claim 7, wherein to adjust a security rating of at least one computer user based on the personal information of said at least one user, the processor being further configured to adjust the security rating of said at least one computer user based on one or more of the age and gender of said at least one computer user.

10. The system of claim 7, wherein to adjust a security rating of at least one computer user based on the professional information of said at least one user, the processor being further configured to adjust the security rating of said at least one computer user based on one or more of the job position, work experience, and level of education of said at least one computer user.

11. The system of claim 7, wherein the processor being further configured to adjust the user security rating of at least one computer user based on information about security incidents on the computer of said at least one computer user.

12. The system of claim 11, wherein the information about security incidents includes: type of incident, source of incident, time of incident, and user activity preceding the incident.

13. A computer program product embedded in a non-transitory computer-readable storage medium, the computer-readable storage medium comprising computer-executable instructions for reducing security risk in a computer network, the instructions for:

collecting, by a processing device, from a plurality of computers in the network information about computer usage, security incidents, and communications between computer users;

retrieving, for each computer user, a user profile comprising at least a personal and professional information of the user, and a plurality of risk factors associated with the user;

calculating, for each computer user, values for the plurality of risk factors in the user profile based on the computer usage information collected from the computer of each user;

calculating, for each computer user, a user security rating based on the values of one or more risk factors of the plurality of risk factors in the user profile;

adjusting a security rating of at least one computer user based on (i) the personal or professional information of said at least one computer user, and (ii) the security rating of at least one other computer user with whom said at least one computer user communicated; and selecting security settings for the plurality of computers based on the security ratings of the users of said computers; and applying the selected security setting to the plurality of computers to reduce security risk in the computer network.

14. The computer program product of claim 13, wherein instructions for calculating a user security rating further comprise instructions for applying fuzzy logic rules to the values of one or more risk factors in the user profile.

15. The computer program product of claim 13, wherein instructions for adjusting a security rating of at least one computer user based on the personal information of said at least one user further comprise instructions for adjusting the security rating of said at least one computer user based on one or more of the age and gender of said at least one computer user.

16. The computer program product of claim 13, wherein instructions for adjusting a security rating of at least one computer user based on the professional information of said at least one user further comprise instructions for adjusting the security rating of said at least one computer user based on one or more of the job position, work experience, and level of education of said at least one computer user.

17. The computer program product of claim 13 further comprising instructions for:

adjusting the user security rating of at least one computer user based on information about security incidents on the computer of said at least one computer user.

18. The computer program product of claim 17, wherein the information about security incidents includes: type of incident, source of incident, time of incident, and user activity preceding the incident.

\* \* \* \* \*